US005595142A

United States Patent [19]
Chill

[11] Patent Number: 5,595,142
[45] Date of Patent: Jan. 21, 1997

[54] THERAPEUTIC ANIMAL TOY

[76] Inventor: Michael Chill, 575 Meridian Ter., Los Angeles, Calif. 90042

[21] Appl. No.: 92,221

[22] Filed: Jul. 15, 1993

[51] Int. Cl.⁶ .................................................. A01K 15/00
[52] U.S. Cl. ........................................................ 119/710
[58] Field of Search ...................... 119/29, 29.5; 482/11; 446/481, 236; 606/234, 235; 128/62 A

[56] References Cited

U.S. PATENT DOCUMENTS

| | | | |
|---|---|---|---|
| 1,006,182 | 10/1911 | Cousin | 119/29.5 |
| 1,731,302 | 10/1929 | Erringer | 606/235 |
| 3,071,476 | 1/1963 | Werft et al. | 119/29.5 |
| 3,315,640 | 4/1967 | Gamble | 119/29 |
| 3,570,457 | 3/1971 | Curtis | 119/29 |
| 3,830,202 | 8/1974 | Garrison | 119/29 |
| 4,802,444 | 2/1989 | Markham et al. | 119/29 |
| 4,928,632 | 5/1990 | Gordon | 119/29.5 |

*Primary Examiner*—Todd E. Manahan
*Assistant Examiner*—Thomas Price
*Attorney, Agent, or Firm*—Lyon & Lyon

[57] ABSTRACT

A therapeutic animal toy is disclosed. In a preferred embodiment the toy is comprised of a hollow elongate body with outer surface ridges running parallel to the axis of the elongate body, inner surface circular ridges to effect a purchase of food held therein, wherein the elongate body is made of a flexural modulus of about 410,000 psi at 73° F., and where the elongate body contains food such as a paste-like canned pet food.

11 Claims, 1 Drawing Sheet

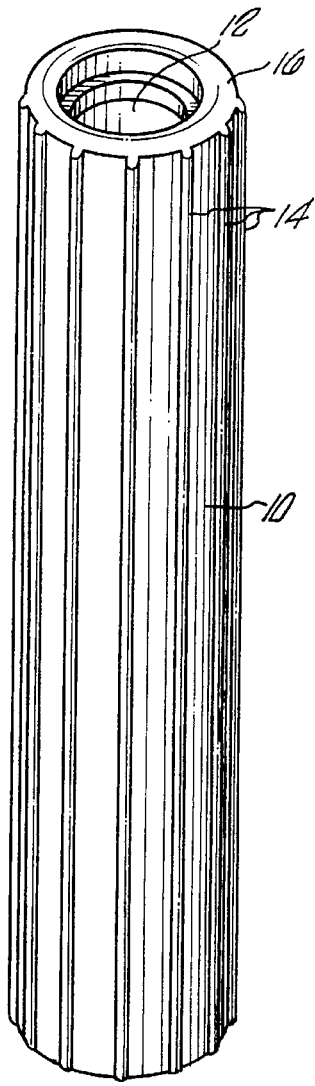
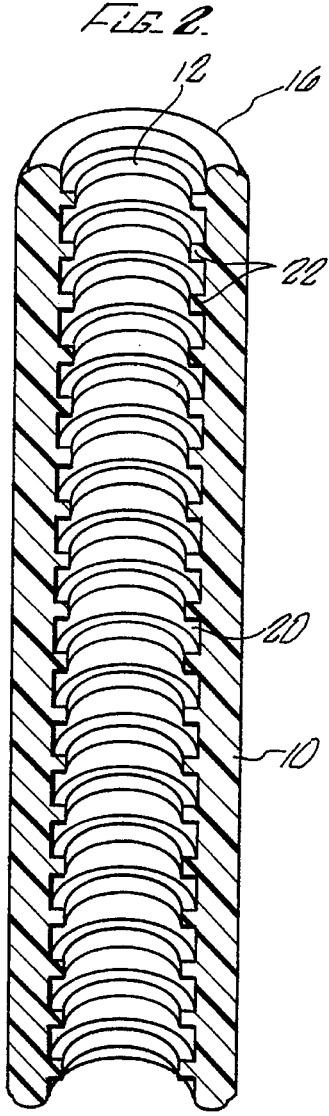
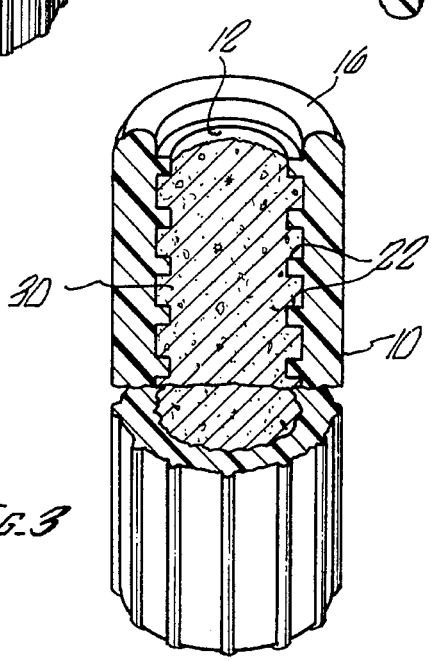

THERAPEUTIC ANIMAL TOY

BACKGROUND OF THE INVENTION

1. Field of the Invention

This invention relates to therapeutic animal toys.

2. Description of the Related Prior Art and Need For the Invention

There are an estimated fifty-two million dogs kept as domestic pets in the United States, creating an estimated twelve billion dollar per year industry. It is further estimated that over two billion dollars of industry revenues are specifically for non-food pet supplies, including chew bones, chew toys and teething remedies. Much of these toys and remedies are to alleviate teething or other chewing behavior by dogs and other domestic pets, which can cause considerable damage to furniture, carpeting, walls, shoes and other items. The damage caused by this behavior can be very expensive.

Presently, there are many chew toys on the market to help control a teething dog or other domestic animal's desire to chew. Examples of these are rawhide chews or bones, cloth "pulls" and ropes, as well as various vinyl, nylon, plastic, rubber and latex toys. All of these toys are designed to help mitigate some of the destruction by a domestic animal's chewing or teething. Each type of chew toy, however, has inherent weaknesses.

The most common chew toy is rawhide, yet it is actively discouraged by veterinarians due to the inherent danger of domestic animals such as dogs swallowing large pieces as the rawhide softens and tears. Other available toys, like various tug-of-war toys such as cloth ropes and rubber pulls by O'Rourke, U.S. Pat. Nos. 5,092,272, Des. 329,310, Des. 328,805, and toys manufactured from vinyl or a hard nylon polymer in various shapes and sizes, are safer, but not optimal. Like many other things in life, the safest is also the least exciting. Since those chew toys have little or no flavor, and very little "give", dogs and other domestic pets find them very boring, and will often ignore them entirely. Even those chew toys that have flavor imbedded into the material become boring to an animal after a short period of time.

Tug-of-war toys such as cloth ropes or rubber pulls can also be problematic to the pet owner. It is widely accepted that playing tug of war encourages over-stimulation and aggression, and many behaviorists discourage pet owners from this type of play. It has been observed, however, that if the pet owner could actually "win" in the tug-of-war game, it would lessen the intrinsic dominance of his or her pet. With current tug toys, this is virtually impossible, since they are designed to allow the pet to literally sink its teeth into them and hold fast. The design of the present invention overcomes this problem entirely by its combination of shape, material and surface design. The design of the present invention allows for it to rather easily be removed from the domestic animal's mouth, avoiding the confrontational aspects of tug-of-war toys.

As mentioned, other inventions, such as U.S. Pat. No. 3,871,334 by Axelrod, have attempted to increase a domestic animal's interest by adding a flavor or odor to a chew toy. A problem with this invention, however, is that only one flavor is impregnated into the toy item. The present invention has the ability to be of variable flavor by inserting different food-stuffs into its cavity.

From a standpoint of domestic animal, or more particularly, dog behavior, it is important to create and develop a toy that can fulfill all the requirements of a chew and play toy. It has to be safe, easy to use, and interesting over time to the pet. It also needs to be multi-purpose. That is, not only a chew item for the teething animal, but also have the potential of being an interactive toy between two or more adult pets, or the pet and his owner. To discourage a domestic animal from becoming bored with the toy, it has to be variable, without requiring a pet owner to purchase several different items. It must likewise be durable and economical.

SUMMARY OF THE INVENTION

The present invention is directed to a domestic animal toy for therapeutic and play purposes. The apparatus heightens the animal's interest and provides the animal owner enhanced control over the therapeutic and play activities.

In a separate aspect of the invention, the toy is made of durable and resilient material that will slightly deform yet return to its original shape.

In another separate aspect of the present invention, the toy contains outer surface design features to assist both animal adherence and animal owner control of therapeutic and play activities.

In another separate aspect of the present invention, the toy contains inner surface variation to help retain food-stuffs.

BRIEF DESCRIPTION OF THE DRAWINGS

FIG. 1 is a perspective view of the toy showing the outer surface.

FIG. 2 is a sectional, perspective view of toy showing the interior surface.

FIG. 3 is a sectional, perspective view of a toy showing food held in the interior.

BRIEF DESCRIPTION OF THE PREFERRED EMBODIMENT

The preferred embodiment will now be described with respect to the drawings. Like elements appearing in multiple figures are similarly numbered.

Referring now to FIG. 1, the housing 10 is a cylindrical body comprised of any suitable material which is durable and resilient. In a preferred embodiment, the housing 10 is a singular piece of material which contains a hollow center 12 and an outer surface of uniform cross section. The material of housing 10 will slightly deform when gripped in a pet's mouth, yet it will return to its original shape when released.

The housing 10 can be made of any FDA-approved thermoplastic or other material such as Dupont Zytel-101L, a nylon resin material approved by the FDA for food containers and utensils. This material is durable, resilient and washable. The preferred material for the housing, such as Zytel-101L, should not release any toxic substances which may harm the pet or contaminate the food.

The preferred material, Zytel-101L, has a measured flexural modulus of 410,000 psi at 73° F., and the material will return to its original shape when released out of the pets mouth. As stated previously, this amount of deformation provided by the preferred material such as Zytel-101L will allow a pet to grip the chew toy in his mouth yet is resilient enough to prevent the pet to sink its teeth into the housing. The chewing of hard plastics also allows for teeth and jaw development in puppies, and will repeatedly satisfy a dog's natural need to chew. Zytel-101L also withstands higher temperatures for easy cleaning.

The housing 10 also includes ridges 14 which can run parallel to the axis of the cylinder axis of the housing 10. The ridges 14 help the pet to maintain the toy when gripped in its mouth. The ridges 14 also prevent excessive roll of the toy when thrown by the pet owner. Further, the ridges 14 do not prevent or hinder the pet owner's ability to remove the toy axially from the side of the animal's mouth. The preferred embodiment of the housing 10 also has rounded edges 16 to avoid hurting the pet.

In other embodiments, the outer surface of the housing 10 can have features such as grooves either parallel, perpendicular or at other angles to the cylinder axis. Other embodiments of the outer surface also include mounds, bumps, spirals or any other surface design features suitable for assisting animal adherence and animal owner control.

Referring now to FIG. 2, the housing 10 can have an interior surface 20 which contains a series of cylindrical ridges 22 to help retain food 30 in the interior of the housing 10. In other embodiments the interior surface 20 can have grooves, or other surface protrusions or markings, either parallel, perpendicular or at other angles to the cylinder axis, to help retain food 30 inside the housing 10.

Compared to rawhide toys, the present invention is far superior. Because domestic animals, especially dogs, actually consume, tear or soften rawhide toys, veterinarians discourage their use. The present invention, however, is nearly indestructible, does not soften or tear, and therefore cannot be swallowed. Like rawhide, however, the present invention can be chewed and has resilient qualities. The present invention will also last much longer than rawhide, thereby eliminating the need to be replaced.

Referring now to both FIGS. 1 and 2, the present invention is designed to have the hollow cavity 12 filled with various food-stuffs. The food contained in hollow cavity 12 will keep and hold the pet's interest. Because the toy can be washed and replenished with various foods, it can be variable in flavor, thereby further increasing a pet's interest. The preferred 30 is one that is palatable, desired by a domestic animal, and paste-like, such as canned pet foods, liverwurst, cheese spread, peanut butter and the like. Since the toy is also a source of food, animals, especially dogs, are also less likely to bury the present invention as they will with other toys and bones. It has been shown that dogs who bury chew bones and toys, are less likely to bury "fetch toys," such as tennis balls. Also, most dogs will not bury food dishes or receptacles. Since this invention is both a fetch toy and a food receptacle it inherently discourages burying.

Another benefit of the present invention is that it can actually discourage food guarding behavior, which is a primary motivation for dog and other domestic dog bites. The game of fetch, as a behavior, inherently discourages ball and toy guarding. When the response is received (dropping the ball or toy), that response is instantly reinforced positively by the immediate throwing of the ball or toy. Ball and toy guarding behavior is naturally discouraged by the fact that, if the dog does not drop the ball or toy, he doesn't receive the reinforcer (the throwing of the ball or toy). Since this toy is also used as a food receptacle, when the game of fetch is employed, the guarding of the food receptacle, and therefore, food, would be greatly diminished.

The present invention is also the ideal fetch toy. The overall shape of the housing 10 and outer surface design features, such as the ridges 14, allow most pets such as dogs to easily pick up and comfortably balance the toy while retrieving. Further, because the material of housing 10 is sufficiently rigid and because the outer surface designs are not so pronounced as to allow the pet to grip the toy in its teeth, the pet owner can easily remove the present invention, by withdrawing it axially from the side of the pet's mouth, rather than engaging in a tug-of-war, which often happens with ropes, balls, frisbees and other toy items. Still further, because of the overall shape of the housing 10 and the ridges 14 or other outer surface designs, the present invention will not roll erratically when thrown, as would a tennis ball.

In other embodiments, instead of the rounded cylindrical shape, any similar polyhedron comprising essentially a cylindrical tube or hollow elongate body can be used, such as a three sided shape up to any multi-sided shape.

What is claimed:

1. A therapeutic animal toy containing food comprising:

a hollow elongate body open at both ends having an outer surface with ridges parallel to the longitudinal axis of said elongate body and an inner surface with circular ridges perpendicular to the longitudinal axis of said elongate body to effect a purchase on food held therein said elongate body being made of a nylon resin material with a flexural modulus of about 410,000 psi at 73 degrees F.

said food being comprised of a paste-like canned pet food.

2. A therapeutic animal toy comprising:

a hollow elongate body open at both ends having an outer surface with protrusions and an inner surface with inwardly extending protrusions food in said hollow elongate body engaged with said inwardly extending protrusions.

3. The therapeutic animal toy of claim 2, further comprising:

said food being comprised of a paste-like canned pet food.

4. The therapeutic animal toy of claim 2, further comprising said hollow elongate body being made of a material which has flexural modulus of about 410,000 psi at 73 F.

5. The therapeutic animal toy of claim 2, further comprising said outer surface protrusions consisting of a series of ridges running axially along the hollow elongate body.

6. The therapeutic animal toy of claim 2, further comprising said inner surface protrusions consisting of cylindrical ridges.

7. The therapeutic animal toy of claim 2, further comprising said hollow elongate body consisting of an arcuate annuli of variable cross-sectional diameters.

8. The therapeutic animal toy of claim 2, further comprising said hollow elongate body consisting of a polyhedron of variable cross-section.

9. The therapeutic animal toy of claim 2, further comprising said hollow elongate body consisting of a cylinder.

10. The therapeutic animal toy of claim 2, further comprising said hollow elongate body consisting of a polyhedron where said outer surface is of uniform cross section.

11. The therapeutic animal toy of claim 2, further comprising said hollow elongate body consisting of a polyhedron of uniform cross section.

\* \* \* \* \*